(12) United States Patent
Gao

(10) Patent No.: US 11,399,090 B2
(45) Date of Patent: Jul. 26, 2022

(54) PAGE CONTROL FOR HISTORY PAGES OF BROWSED DATA

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventor: Linjie Gao, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/262,986

(22) PCT Filed: Jul. 25, 2019

(86) PCT No.: PCT/CN2019/097631
§ 371 (c)(1),
(2) Date: Jan. 25, 2021

(87) PCT Pub. No.: WO2020/020272
PCT Pub. Date: Jan. 30, 2020

(65) Prior Publication Data
US 2021/0168234 A1 Jun. 3, 2021

(30) Foreign Application Priority Data
Jul. 27, 2018 (CN) .......................... 201810840325.9

(51) Int. Cl.
H04M 1/72445 (2021.01)
G06F 16/9535 (2019.01)
(Continued)

(52) U.S. Cl.
CPC ...... *H04M 1/72445* (2021.01); *G06F 3/0482* (2013.01); *G06F 3/0483* (2013.01); *G06F 16/9535* (2019.01); *G06Q 30/0641* (2013.01)

(58) Field of Classification Search
None
See application file for complete search history.

(56) References Cited

U.S. PATENT DOCUMENTS 10,884,810 B1 * 1/2021 Verma ..................... H04L 67/02
2008/0046840 A1 * 2/2008 Melton .................. G06F 16/951
715/825

(Continued)

FOREIGN PATENT DOCUMENTS

CN 103885992 A 6/2014
CN 104216967 A 12/2014
(Continued)

OTHER PUBLICATIONS

International Search Report dated Oct. 22, 2019 in PCT/CN2019/097631, 2 pages.
(Continued)

Primary Examiner — Mandrita Brahmachari
(74) Attorney, Agent, or Firm — Oblon, McClelland, Maier & Neustadt, L.L.P.

(57) ABSTRACT

The present disclosure relates to a page control method and apparatus, and a computer-readable storage medium, and pertains to the technical field of application software. The method includes detecting an operation of a user on a current page of an application, displaying a label of each of at least one history page visited by the user, in response to detecting that the user triggers a page selection function, and jumping to a page corresponding to a label selected by the user from the current page, in response to detecting that the operation of the user is to select the label.

18 Claims, 5 Drawing Sheets

(51) Int. Cl.
   *G06F 3/0482* (2013.01)
   *G06F 3/0483* (2013.01)
   *G06Q 30/06* (2012.01)

(56) References Cited

U.S. PATENT DOCUMENTS

| | | | |
|---|---|---|---|
| 2010/0306658 A1* | 12/2010 | Ariyoshi | H04M 1/72445 |
| | | | 715/733 |
| 2014/0304738 A1* | 10/2014 | Nakaoka | G06F 16/9562 |
| | | | 725/37 |
| 2014/0359489 A1 | 12/2014 | Zhao et al. | |
| 2017/0220692 A1* | 8/2017 | Greenwood | G06N 20/10 |
| 2017/0372165 A1* | 12/2017 | Jouhikainen | G06V 10/82 |
| 2019/0362413 A1* | 11/2019 | Joshi | G06Q 30/0641 |

FOREIGN PATENT DOCUMENTS

| | | |
|---|---|---|
| CN | 106201230 A | 12/2016 |
| CN | 106874390 A | 6/2017 |
| CN | 107741826 A | 2/2018 |
| CN | 108022153 A | 5/2018 |

OTHER PUBLICATIONS

International Preliminary Report on Patentability and Written Opinion dated Feb. 2, 2021 in PCT/CN2019/097631 (with English Translation), 12 pages.

Combined Chinese Office Action and Search Report dated Apr. 14, 2021 in corresponding Chinese Patent Application No. 201810840325.9 (with English Translation and English Translation of Category of Cited Documents), 20 pages.

\* cited by examiner

PAGE CONTROL FOR HISTORY PAGES OF BROWSED DATA

CROSS-REFERENCE TO RELATED APPLICATIONS

The present disclosure is a U.S. National Stage Application under 35 U.S.C. § 371 of International Patent Application No. PCT/CN2019/097631, filed on Jul. 25, 2019, which is based on and claims priority of Chinese application for invention No. 201810840325.9 filed on Jul. 27, 2018, disclosures of both which are hereby incorporated into this disclosure by reference in its entirety.

TECHNICAL FIELD

The present disclosure rebates to the technical field of application software, and in particular, to a page control method and apparatus, and a computer-readable storage medium.

BACKGROUND

With the development of mobile communication technologies and intelligent terminal technologies, intelligent terminals play a more and more important role in the people's life.

Various types of applications (APP) can be installed on the intelligent terminal to achieve different functions. Shopping APPs of e-commerce platforms are APPs often used by many people.

SUMMARY

According to some embodiments of the present disclosure, there is provided a page control method comprising: detecting an operation of a user on a current page of an application; displaying a label of each f at least one history page visited by the user, in response to detecting that the user triggers a page selection function; and jumping to a page corresponding to a label selected by the user from the current page, in response to detecting that the operation of the user is to select the label.

In some embodiments, displaying a label of each of at least history page visited by the user, in response to detecting that the user triggers a page selection function comprises: reading record information of the at least one history page from a built-in database of the application, in response to detecting that the user triggers the page selection function; and generating the label of each of the at least one history page according to the record information for displaying.

In some embodiments, the record information of the at least one history page comprises identification information of each of the at least one history page, a link to each of the at least one history page, a type of each of the at least one history page and access time to each of the at least one history page, and the generating the label of each of the at least one history page according to the record information for displaying comprises: for each of the at least one history page, generating the label of the history page according to the identification information of the history page and the type of the history page, wherein the identification information of the history page is displayed in the label of the history page; in a case where the at least one history page comprises multiple history pages, ranking the labels of the history pages according to the access time to each of the history pages to obtain a ranking result and displaying the ranking result; and for each of the at least one history page, establishing a deep link between the label of the history page and the history page.

In some embodiments, the label of each of the at least one history page is associated with the link to the history page, and the jumping to a page corresponding to a label selected by the user from the current page, in response to detecting that the operation of the user is to select the label comprises: jumping to the page corresponding to the label selected by the user from the current page according to the link associated with the label, in response to detecting that the operation of the user is to select the label.

In some embodiments, a page selection area is set in the page jumped to, for displaying the label of at least one history page visited by the user before the page jumped to, in response to that the user triggers the page selection function.

In some embodiments, the method further comprises: acquiring record information of the current page in response to opening the current page; and taking the record information of the current page as record information of one history page to be stored in a built-in database of the application.

In some embodiments, for each of the at least one history page, the label of the history page comprises an "add to shopping cart" function key in a case that the label of the history page is a label of a commodity detail page, the page control method further comprises: calling a preset interface to send a commodity identification corresponding to the label of the history page to a server for recoding a behavior that the user adds the commodity into the shopping cart recording, in response to that the user triggers a function "add to shopping cart".

In some embodiments, the method further comprises: for each of the at least one history page, sending a deletion instruction to a built-in database of the application to delete record information corresponding to the label of the history page, in response to an operation of deleting the label of the history page by the user.

In some embodiments, the method further comprises: for each of the at least one history page, calling a sharing interface of the application to share a link corresponding to the label of the history page to an application to be shared, in response to that the user triggers a sharing function of the label of the history page.

According to still other embodiments of the present disclosure, there is provided a page control apparatus comprising: a memory; and a processor coupled to the memory, the processor configured to perform the page control method of any of the preceding embodiments based on instructions stored in the memory.

According to still further embodiments of the present disclosure, there is provided a non-transitory computer-readable storage medium storing computer programs, when executed by a processor, cause the processor to implements the page control method of any of the preceding embodiments.

Other features and advantages of the present disclosure will become clear from the following detailed descriptions of the illustrative embodiments of the present disclosure with reference to accompanying drawings.

BRIEF DESCRIPTION OF THE DRAWINGS

The accompanying drawings, which are included to provide a further understanding of the present disclosure an constitute a part this application, illustrate embodiment(s) of the present disclosure and together with the description serve to explain the present disclosure but not to limit the present disclosure. In the drawings.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure instead of all of them. The following descriptions on at least one illustrative embodiment are actually illustrative, but shall not set any limitation on the present disclosure and its application or use. All other embodiments that are obtainable to those skilled in the art based on the embodiments of the present disclosure without any creative effort are included in the protection scope of the present disclosure.

The inventor found that, as the screen of an intelligent terminal such as a mobile phone is smaller relative to a computer, APPs of e-commerce websites for a small intelligent terminal are generally designed in a single-window mode. This makes it impossible to open multiple windows simultaneously, as in a computer browser. When a user wants to return to previously viewed pages again while browsing a certain page, it is usually very troublesome to go back to the previous pages step by step, or research the previous pages or the like. If the user closes or switches the APP to the background and returns to the APP, he can return at most to the last browsed page, and cannot open all pages of historical sessions like the computer browser which can recover the opened history pages or label functions to make it convenient for the user to return to the pages or functions one by one for continuous viewing.

Accordingly, the present disclosure provides a solution for opening a corresponding history page according to a user's requirement.

The present disclosure provides a page control method for APPs, which is described below with reference to FIG. 1.

Figure 1:
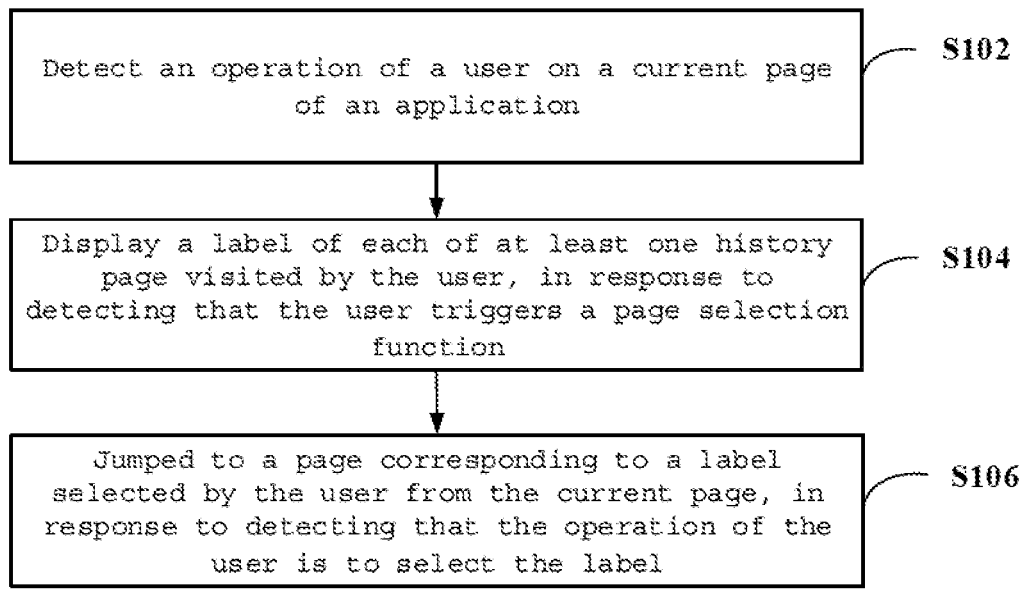
FIG. 1 illustrates a flowchart of a page control method according to some embodiments of the present disclosure.

FIG. 1 is a flowchart of the method according to some embodiments of the present disclosure. As shown in FIG. 1, the method according to the embodiments comprises: steps S102 to S106.

In step S102, an operation of a user on a current page of an application is detected.

A page selection area may be set in the page, and the operation of the user is detected in the page selection area. The page selection area may be configured, for example, as a floating button, by clicking on which the user may trigger a page selection function. The page selection area can also be a sliding key, and the user can trigger the page selection function through a sliding operation. The setting of a specific page selection area and the corresponding trigger operation to trigger the page selection function can be set according to actual needs. The application may be an application of an e-commerce platform. The current page may be any page in the application such as a commodity detail page, an activity detail page, a home page, or a search page.

In step S104, a label of each of at least one history page visited by the user is displayed, in response to detecting that the user triggers a page selection function.

In some embodiments, a click listener function in a floating button control is called to display the label of each of the at least one history page, in response to that the user clicks on the floating button of the page selection function. The label of each of the at least one history page may be displayed in a popup window or other form. Taking the Android system and the page selection area being the floating button as an example, the floating button can be implemented by using a Floating Action Button control. It is only needed to set a click event of Floating Action Button to directly call a setOnClickListener( ) method. A popup window to display the label of each of the at least one history page is set in the setOnClickListener( ) method, that when the user clicks on the floating button, the label of each of the at least one history page will be displayed in the popup window.

Further, for example, it is determined by the click listener function that the operation of the user is to trigger the page selection function, and a splay function in a popup window control is called to d splay the label of each of the at least one the history page at a specified position. Taking the Android system as an example, the popup window of the label of each of the at least one history page can be implemented by a Popup Window control, which can display any View and float at the top of the current Activity. For example, a constructor of the Popup Window may be called first to create a Popup Window object and to complete some initialization settings. Then a showAtLocation( ) method in the Popup Window control is called to display Popup Window at the specified location.

Further, data and a layout of an entity class corresponding to the label of the at least one history page in a list view control can be acquired through the display function, and the label of the at least one history page is displayed in a list form.

The popup window may show a list of the label of the at least one history page, and by taking the Android system as an example, the list may be implemented by using a ListView control. The ListView control is introduced into a layout file of the popup window, for displaying the list of the label of the at least one history page. A subentry layout of ListView is created that defines a specific display UI (User Interface) for the label of each of the at least one history page in the list. An entity class corresponding to the label of the at least one history page can be defined as an adaptation type of the ListView adapter, the entity class contains all data members of a label of a history page, and an object of the entity class represents a label of a history page. A self-defined adapter is created in which display behaviors of sub-elements in each label can be defined. An adapter object is created (loading current Context, ListView subentry layout ID, adapted data in turn). By calling a setAdapter( ) method of the ListView and transferring thereinto the constructed adapter object, the association between the List-View and the data of the label of the at least one history page is established.

The label of each of the at least one history page is used for representing a page visited by the user in history. The label of the at least one history page may be displayed in a list or other format. Rendered in the list of the label of the at least one history page is data of the label of each of the at least one history page. The data of the label of each of the at least one history page can comprise information such as identification information and a label ID of the history page, wherein the identification information of the history page comprises for example at least one of an icon of the history page or a title of the history page. The icon of the history page is, for example, a commodity picture. Further, the data of the label of each of the at least one history page may further comprise a link to the history page, a type of the history page, and the like. The link to the history page represents a http(s) link to the history page. The type of the history page indicates whether the page represented by the label is a commodity detail page, an activity page or the like. Different forms of labels of the history pages can be displayed according to different types of the history pages. The information such as the identification information and the label ID of the history page is used for displaying, but the link to the history page and the type of the history page may not be displayed and are used for generating the label of the history page or realizing the jump of the page.

In some embodiments, in response to detecting that the user triggers the page selection function, record information of the at least one history page is read from a built-in database of the application, and the label of each of the at least one history page is generated according to the record information for displaying.

Further, for each of the at least one history page, the label of the history page may be generate according to the identification information of the history page and the type of the history page, and the identification information of the history page is displayed in the label of the history page. In a case where the at least one history page comprises multiple history pages, the labels of the history pages are ranked according to the access time to each of the history pages to obtain a ranking result and the ranking result is displayed. For each of the at least one history page, a deep link between the label of the history page and the history page is established.

A small database can be configured in an operating system of the intelligent terminal, for storing record information of at least one history page browsed by the user. In a case that the label of the at least one history page needs to be displayed, an interface of the built-in database is called, the record information of the at least one history page is inquired, and the label of the at least one history page is generated according to the record information of the at least one history page. The record information of the at least one history page comprises, for example: identification information of each of the at least one history page, a type of each of the at least one history page and access time to each of the at least one history page, and further a link to each of the at least one history page, access time to each of the at least one history page, and the like. Or, the information may be stored directly in a chronological order without storing the access time.

Taking the Android system as an example, SQLite is used in an Android application, and data storage is completed by creating a database, then creating a table and an index and filling data. SQLiteOpenHelper can be utilized to create a database, and the database can be created by inheriting the SQLiteOpenHelper class. The SQLiteOpenHelper class encapsulates the logic used to create and update the database as needed to develop the application. To create the table and index, an execSQL( ) method of the SQLiteOpenHelper may be called to execute a DDL statement. INSERT, UPDATE, DELETE, etc. statements may be executed by using the execSQL( ) method to update the record information of the history page in the table.

For each of the at least one history page, the label of the history page containing the identification information of the history page can be generated according to the type of the history page. The display order of the label of each of the at least one history page can be determined according to the access time, the stay time or the number of times of access of each of the at least one history page. For example, the label of the at least one history page is displayed in a sequence from late to early according to the access time to each history page, or the label of the at least one history page is displayed in a sequence from long to short according to the stay time of the user on each history page, or the label of the at least one history page is displayed in a sequence from large to small according to the number of times of access of the user on each history page. A deep link can be established between the label of each history page and the history page.

In step S106, a page corresponding to a label selected by the user is jumped to from the current page, in response to detecting that the operation of the user is to select the label.

In some embodiments, the label of each of the at least one history page is associated with the link to the history page. The page corresponding to the label selected by the user is jumped to from the current page according to the link associated with the label, in response to detecting that the operation of the user is to select the label.

The jumping of the page can be realized by adopting a Deep Linking technique. The link to each of the at least one history page may be a URI (Uniform Resource Identifier) or a URL (Uniform Resource Locator) generated according to the deep linking technique, and includes an application identification and a routing parameter etc. It can be defined in the application that an intent filter of the application is opened through a link Http(s) address of the history page, and an intent corresponding to the URI is routed to the corresponding application by verifying the application by the operating system.

Taking the Android system as an example, the deep link may be an Android App Link, and the process of verifying the application in the terminal is for example to set the system in AndroidManifest to automatically perform ownership verification of App Links. It is verified whether the application belongs to the URI or URL domain name specified in the intent filter or not by the configured Android system. The relationship between the links to the history page and the application can be declared by placing a JSON file of digital asset link in the following link address: https://domain.name/.well-known/assetlinks.json.

The method according to the above embodiment enables the user to directly jump to the original page of the application when selecting the label of the history page, does not need to regenerate the page, which has little change on the original application, and is convenient and fast to implement.

A page selection area can also be set in the page jumped to, for displaying the label of at least one history page visited by the user before the page jumped to, in response to that the user triggers the page selection function.

In the method according to the above embodiment, a triggering of a page selection function by the user is detected in a page of the application, so as to display a label of each of at least one history page. In a case that the user selects a label of one history page, the corresponding page can be directly jumped to. The user does not need to perform tedious operations to return to the previously browsed pages, and the corresponding history pages can be opened according to the user's requirement which is simple and convenient in operation and improves user experience.

Some other embodiments of the page control method of the present disclosure are described below in conjunction with FIG. 2.

Figure 2:
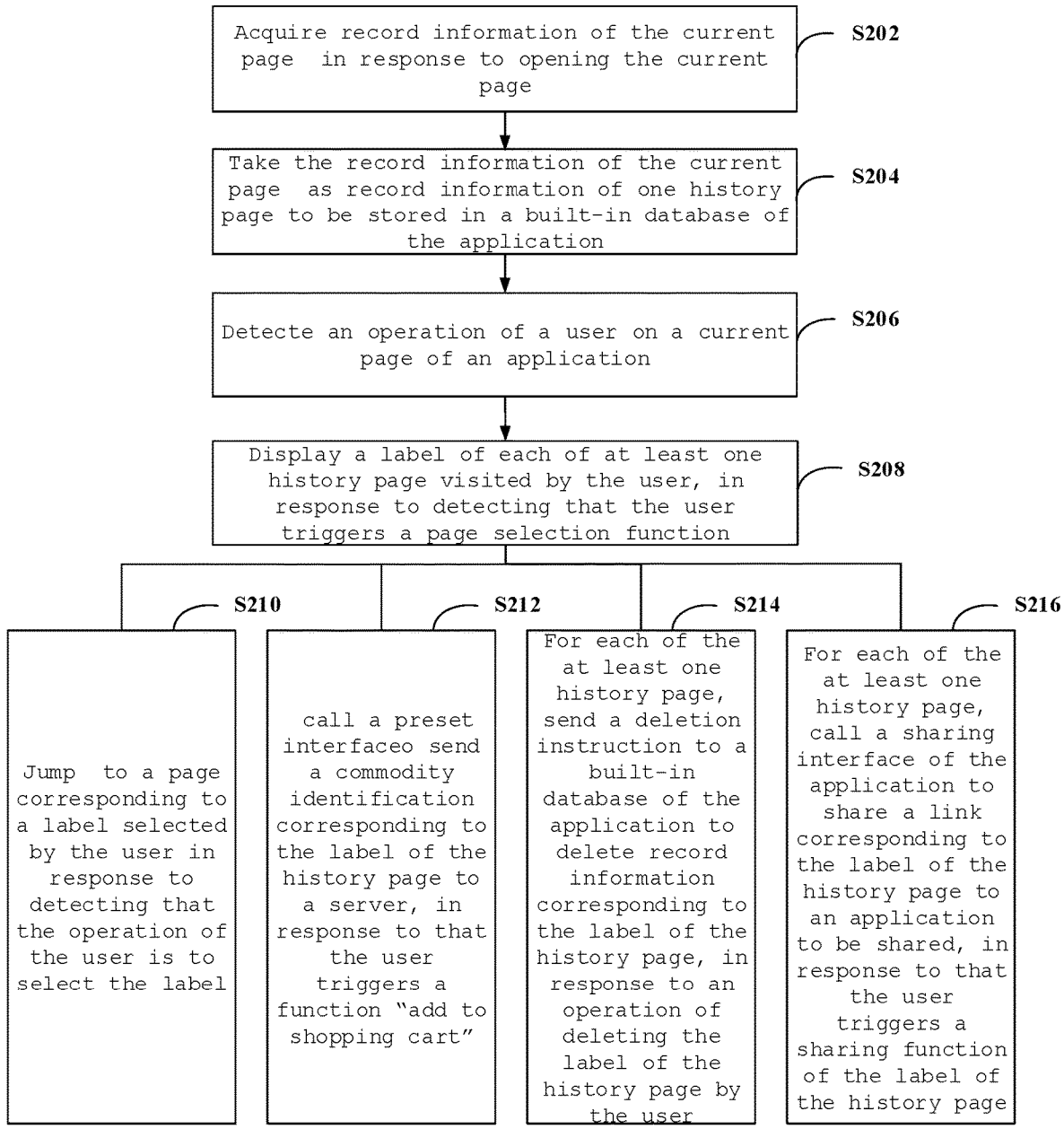
FIG. 2 illustrates a flowchart of a page control method according to some other embodiments of the present disclosure.

FIG. 2 is a flowchart of a page control method according to some embodiments of the present disclosure. As shown in FIG. 2, the method according to the embodiments comprises: S202 to S216.

In step S202, record information of the current page is acquired in response to opening the current page.

In step S204, the record information of the current page is taken as record information of one history page to be stored in a built-in database of the application.

Taking the Android system as an example, when the user opens the current page, an INSERT statement is executed by exeSQL( ) of SQLiteOpenHelper to newly add record information of one history page, and the icon, title, link, type and the like of the history page are stored in the database.

In step S206, an operation of a user on a current page of an application is detected.

In step S208, a label of each of at least one history page visited by the user is displayed, in response to detecting that the user triggers a page selection function.

In step S210, a page corresponding to a label selected by the user is jumped to from the current page, in response to detecting that the operation of the user is to select the label.

In step S212, a preset interface is called to send a commodity identification corresponding to the label of the history page to a server for recoding a behavior that the user adds the commodity into the shopping cart recording, in response to that the user triggers a function "add to shopping cart".

For each of the at least one history page, an "add to shopping cart" function key is displayed in the label of the history page in a case that the label of the history page is a label of a commodity detail page. The user can load the commodity ID corresponding to the label of the history page and send the commodity ID to the server by clicking on the "add to the shopping cart" function key and calling API (application program interface) provided by an APP shopping cart module, so as to achieve the function of adding the commodity corresponding to the label of the history page to the shopping cart.

In step S214, for each of the at least one history page, a deletion instruction is send to a built-in database of the application to delete record information corresponding to the label of the history page, in response to an operation of deleting the label of the history page by the user.

A corresponding deletion function can be provided for the label of each of the at least one history page, and an "empty list" function can also be provided for a list of the label of the at least one history page. The deletion function may be provided in the form of a button or a slide key, etc.

Taking the Android system as an example, a click response event of a DELETE button may be set, an execSQL( ) method of SQLiteOpenHelper may be executed in a response function, and a corresponding record may be deleted from the database through a DELETE statement. Meanwhile, a list ListView of the label of the at least one history page is refreshed, so that the label of the history page is deleted.

In step S216, for each of the at least one history page, a sharing interface of the application is called to share a link corresponding to the label of the history page to an application to be shared, in response to that the user triggers a sharing function of the label of the history page.

For each of the at least one history page, the sharing function can be provided in the label of the history page. The labels of multiple history pages can also be shared. For example, a selection function is provided, and in response to that the user selects the labels of multiple history pages and triggers the sharing function, and then the labels of the multiple history pages are combined into a list to be shared. A sharing function of the whole list can also be provided for the list of the label of the at least one the history page.

In a case that the user triggers the sharing function of the list of the label of the at least one history page or the labels of multiple history pages, the link of each history page is inquired from the built-in database of the application and transferred to the sharing interface, then the link can be shared to other application platforms. The labels of the multiple history pages can be arranged in a list form, and after they are shared to other application platforms, the user clicks on the shared link, and then the list of labels of the multiple history pages is displayed. In addition, according to a characteristic of the deep link, when the link is shared to another user, when the user clicks on the link, if the APP is not installed, a H5 version corresponding to the link is opened directly by a mobile browser, and if the APP is installed, the corresponding page of the APP can be jumped to.

Taking the Android system as an example, the sharing interface provided by the APP is called to share the list. Firstly, a SELECT statement is executed by execSQL( ) of SQLiteOpenHelper to query all record information of the history pages visited by the user, then, each label is spliced into a piece of html to be transmitted to the sharing interface, and therefore the labels of the history pages visited by the user can be shared in the form of a list.

In some embodiments, a close function of the page selection function is provided, and the current page is displayed in response to that the user triggers the close function of the page selection function.

In some embodiments, in a case where the at least one history page comprises multiple history pages, for each of the history pages, in response to that the user moves the label of the history page, a sequence of the labels of the history page is adjusted according to the operation of the user.

Taking the Android system as an example, a popup window that displays the list of the label may be closed by means of a click response function of a close button in which a dismiss ( ) method of PopupWindow is called.

The steps S210-S216 can be parallel optional steps without any sequence.

In the method according to the above embodiments, the functions of adding to the shopping cart, sharing, deleting and the like are provided for the user while the label of the at least one history page is displayed, which further facilitates the use of the user and improves the user experience.

Some application examples of the present disclosure are described below in conjunction with FIG. 3.

Figure 3:
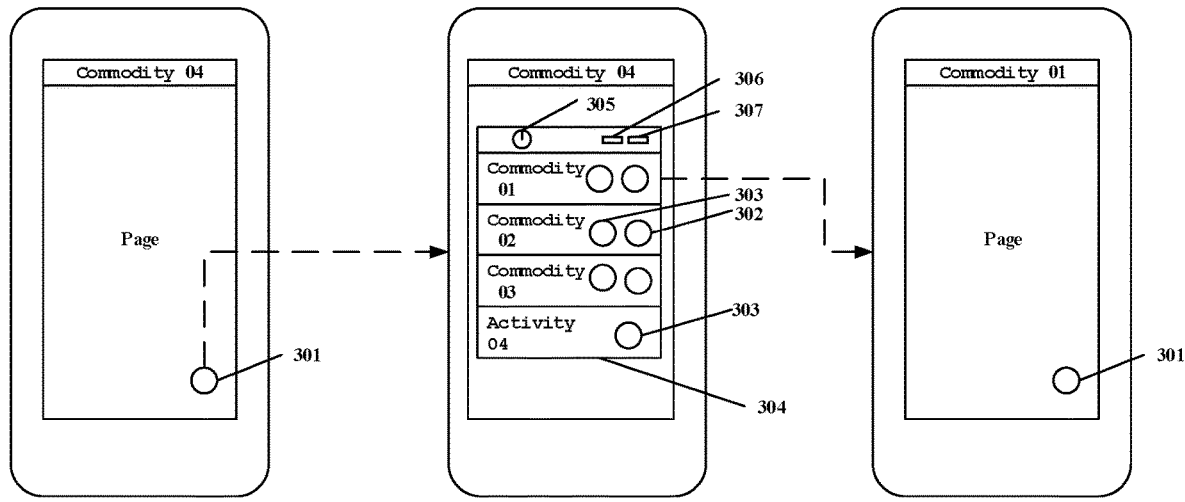
FIG. 3 illustrates a schematic diagram of a page display according to some embodiments of the present disclosure.

FIG. 3 is a front view of some embodiments of a page display of the present disclosure. As shown in FIG. 3, the current page is a detail page of commodity 04, the lower right corner shows a floating button 301 of the page selection function, and a list of labels of the history pages is popped up on the detail page of the commodity 04 when the user clicks on the floating button 301. The label of each history page comprises a commodity name and a commodity icon, or an activity name and an activity icon, and the like. An "add to shopping cart" function key 302 and a sharing function key 303 can be arranged following the label corresponding to the commodity. A function 304 to slide leftward to delete label may also be provided. The upper area of the popup window may be provided with a close button 305 to close the popup window of the list of the labels. A "share list" function key 306, and a "delete list" function key 307 can be set. When the user clicks on the label of one history page of the commodity 01, the detail page of the commodity 01 is jumped to.

The present disclosure also provides a page control apparatus, which is described below with reference to FIG. 4.

Figure 4:
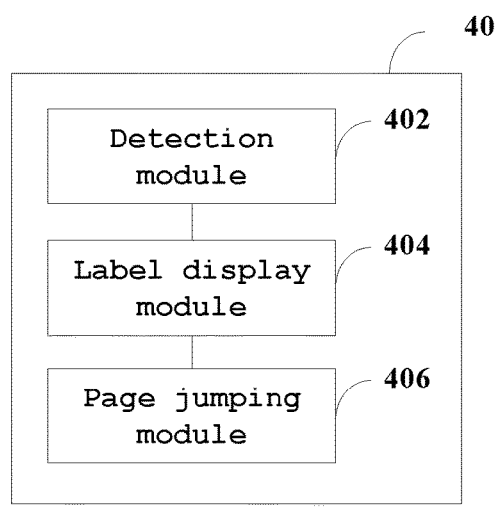
FIG. 4 illustrates a schematic structural diagram of a page control apparatus according to some embodiments of the present disclosure.

FIG. 4 is a block diagram of a page control apparatus according to some embodiments of the present disclosure. As shown in FIG. 4, the apparatus 40 according to the embodiments comprises: a detection module 402, a label display module 404, and a page jumping module 406.

The detection module 402 is configured to detect an operation of a user on a current page of an application.

The label display module 404 is configured to display a label of each of at least one history page visited by the user, in response to detecting that the user triggers a page selection function.

In some embodiments, the label display module 404 is configured to read record information of the at least one history page from a built-in database of the application, in response to detecting that the user triggers the page selection function; and generate the label of each of the at least one history page according to the record information for displaying.

In some embodiments, the record information of the at least one history page comprises identification information of each of the at least one history page, a link to each of the at least one history page, a type of each of the at least, one history page and access time to each of the at least one history page. The label display module 404 is configured to for each of the at least one history page, generate the label of the history page according to the identification information of the history page and the type of the history page, wherein the identification information of the history page is displayed in the label of the history page; in a case where the at least one history page comprises multiple history pages, rank the labels of the history pages according to the access time to each of the history pages to obtain a ranking result and displaying the ranking result; and for each of the at least one history page, establish a deep link between the label of the history page and the history page.

The page jumping module 406 is configured to jump to a page corresponding to a label selected by the user from the current page, in response to detecting that the operation of the user is to select the label.

In some embodiments, the label of each of the at least one history page is associated with the link to the history page; the page jumping module 406 is configured to jump to the page corresponding to the label selected by the user from the current page according to the link associated with the label, in response to detecting that the operation of the user is to select the label.

In some embodiments, a page selection area is set in the page jumped to, for displaying the label of at least one history page visited by the user before the page jumped to, in response to that the user triggers the page selection function.

Some other embodiments of the page control apparatus of the present disclosure are described below in conjunction with FIG. 5.

Figure 5:
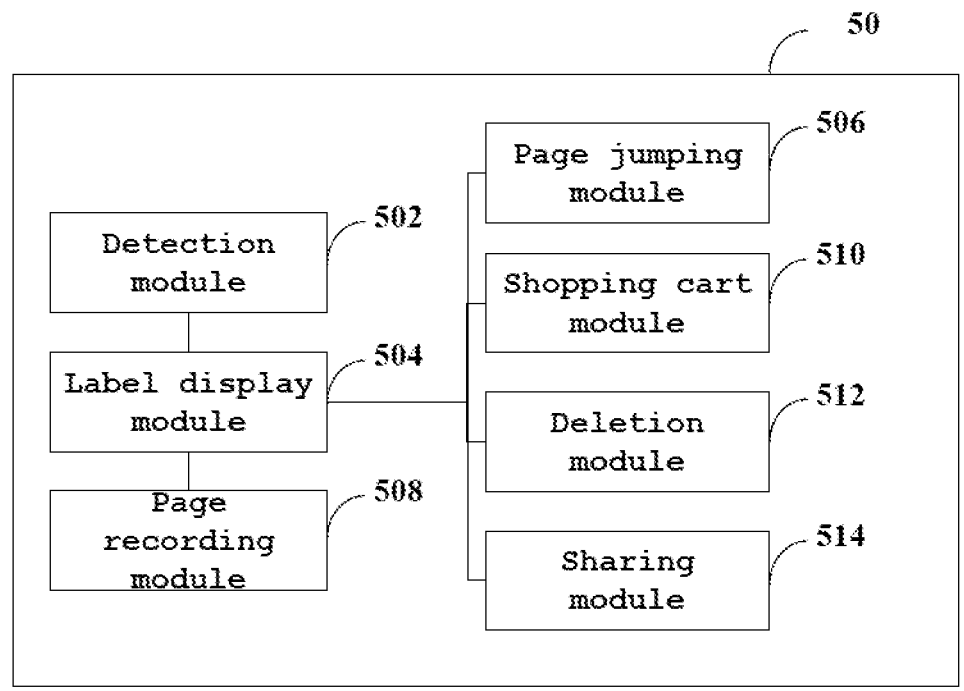
FIG. 5 illustrates a schematic structural diagram of a page control apparatus according to some other embodiments of the present disclosure.

FIG. 5 is a block diagram of a page control apparatus according to some other embodiments of the present disclosure. As shown in FIG. 5, the apparatus 50 according to the embodiments comprises: a detection module 502, a label display module 504, and a page jumping module 506, which are similar to the detection module 402, the label display module 404, and the page jumping module 406, respectively, a page recording module 508, a shopping cart module 510, a deletion module 512, and a sharing module 514.

The page recording module 508 is configured to acquire record information of the current page in response to opening the current page; and take the record information of the current page as record information of one history page to be stored in a built-in database of the application.

In some embodiments, for each of the at least one history page, the label of the history page comprises an "add to shopping cart" function key in a case that the label of the history page is a label of a commodity detail page. The shopping cart module 510 is configured to call a preset interface to send a commodity identification corresponding to the label of the history page to a server for recoding a behavior that the user adds the commodity into the shopping cart recording, in response to that the user triggers a function "add to shopping cart".

In some embodiments, the deletion module 512 is configured to for each of the at least one history page, send a deletion instruction to a built-in database of the application to delete record information corresponding to the label of the history page, in response to an operation of deleting the label of the history page by the user.

In some embodiments, the sharing module 514 is configured to for each of the at least one history page, call a sharing interface of the application to share a link corresponding to the label of the history page to an application to be shared, in response to that the user triggers a sharing function of the label of the history page.

The page control apparatus in the embodiments of the present disclosure may each be implemented by various computing devices or computer systems, which are described below in conjunction with FIGS. 6 and 7.

Figure 6:
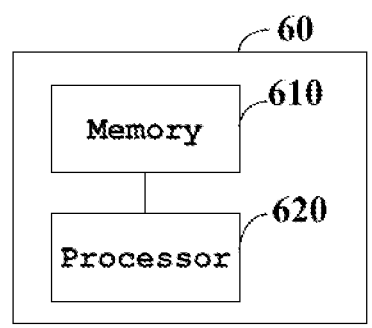
FIG. 6 illustrates a schematic structural diagram of a page control apparatus according to still other embodiments of the present disclosure.

FIG. 6 is a block diagram of a page control apparatus according to some embodiments of the present disclosure. As shown in FIG. 6, the apparatus 60 according to the embodiments comprises: a memory 610 and a processor 620 coupled to the memory 610, wherein the processor 620 is configured to perform the page control method in any of the embodiments of the present disclosure based on instructions stored in the memory 610.

The memory 610 may comprise, for example, a system memory, a fixed non-volatile storage medium, and the like. The system memory stores, for example, an operating system, an application, a Boot Loader, and other programs.

Figure 7:
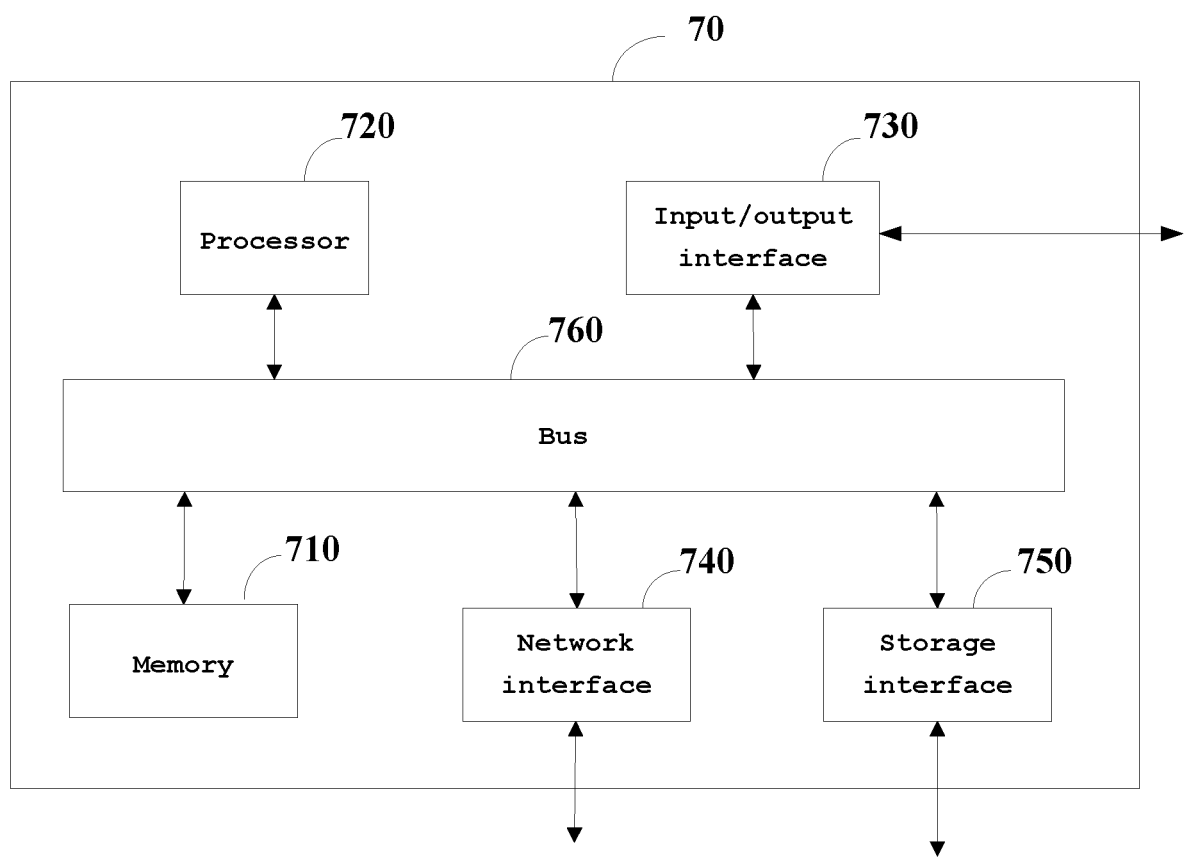
FIG. 7 illustrates a schematic structural diagram of a page control apparatus according to further embodiments of the present disclosure.

FIG. 7 is a block diagram of a page control apparatus according to some other embodiments of the present disclosure. As shown in FIG. 7, the apparatus 70 according to the embodiments comprises: a memory 710 and a processor 720, which are similar to the processor 610 and the processor 620, respectively, and may also comprise an input/output interface 730, a network interface 740, a storage interface 750, and so forth. These interfaces 730, 740, 750, the memory 710 and the processor 720 may be connected, for example, via a bus 760. The input/output interface 730 provides a connection interface for input/output devices such as a display, a mouse, a keyboard, a touch screen, and the like. The network interface 740 provides a connection interface for various networking devices, such as a database server or a cloud storage server. The storage interface 750 provides a connection interface for an external storage device such as an SD card and a USB flash disk, etc.

Those skilled in the art will appreciate that embodiments of the present disclosure may be provided as a method, system, or computer program product. Therefore, the embodiments of the present disclosure can take the form of an entirely hardware embodiment, an entirely software embodiment or an embodiment containing both hardware and software elements. Moreover, this disclosure can be in a form of one or more computer program products containing the computer-executable codes which can be implemented in the computer-executable non-transitory storage media (including but not limited to disk memory, CD-ROM, optical memory, etc.).

The present disclosure is described with reference to the flow charts and/or block diagrams of the method, device (system) and computer program product according to the embodiments of the present disclosure. It shall be understood that each flow and/or block in the flowcharts and/or block diagrams and a combination of the flows and/or blocks in the flowcharts and/or block diagrams can be implemented by computer program instructions. These computer program instructions can be provided to a general purpose computer, a special purpose computer, an embedded processor, or a processor of other programmable data processing devices so as to generate a machine for generating means for implementing the functions of one or more flows of a flowchart and/or one or more blocks of a block diagram by using the instructions executed by the computer or the processor of other programmable data processing devices.

These computer program instructions can also be stored in a computer readable memory guiding the computer or other programmable data processing devices to work in a particular way, such that the instructions stored in the computer readable memory generate an article of manufacture containing instruction means which implement the functions of one or more flows of a flowchart and/or one or more blocks in a block diagram.

These computer program instructions can also be loaded onto a computer or other programmable data processing devices such that a series of operational steps are performed on a computer or other programmable devices to produce computer-implemented processing, so that the instructions executed on a computer or other programmable devices provide steps for implementing the functions of one or more flows of a flowchart and/or one or more blocks of a block diagram.

The above content is only preferred embodiments of the present disclosure, but cannot be used for limiting this disclosure. Any modification, equivalent substitution and improvement, etc. within the spirit and principle of this disclosure shall be contained within the scope of protection of this disclosure.

What is claimed is:

1. A page control method for history pages of browsed data comprising:
   detecting an operation of a user on a current page of an application;
   displaying a label of each of at least one history page visited by the user in a browsing session, in response to detecting that the user triggers a page selection function; and
   jumping to a page corresponding to a label selected by the user from the current page, in response to detecting that the operation of the user is to select the label;
   wherein for each of the at least one history page, the label of the history page comprises an "add to shopping cart" function key in a case that the label of the history page is a label of a commodity detail page, and the page control method further comprises:
   calling a preset interface to send a commodity identification corresponding to the label of the history page to a server for recoding a behavior that the user adds the commodity into the shopping cart recording, in response to that the user triggers a function "add to shopping cart".

2. The page control method according to claim 1, wherein displaying a label of each of at least one history page visited by the user, in response to detecting that the user triggers a page selection function comprises:
   reading record information of the at least one history page from a built-in database of the application, in response to detecting that the user triggers the page selection function; and
   generating the label of each of the at least one history page according to the record information for displaying.

3. The page control method according to claim 2, wherein the record information of the at least one history page comprises identification information of each of the at least one history page, a link to each of the at least one history page, a type of each of the at least one history page and access time to each of the at least one history page, and the generating the label of each of the at least one history page according to the record information for displaying comprises:
   for each of the at least one history page, generating the label of the history page according to the identification information of the history page and the type of the history page, wherein the identification information of the history page is displayed in the label of the history page;
   in a case where the at least one history page comprises multiple history pages, ranking the labels of the history pages according to the access time to each of the history pages to obtain a ranking result and displaying the ranking result; and
   for each of the at least one history page, establishing a deep link between the label of the history page and the history page.

4. The page control method according to claim 1, wherein the label of each of the at least one history page is associated with the link to the history page, and the jumping to a page corresponding to a label selected by the user from the current page, in response to detecting that the operation of the user is to select the label comprises:
   jumping to the page corresponding to the label selected by the user from the current page according to the link associated with the label, in response to detecting that the operation of the user is to select the label.

5. The page control method according to claim 1, wherein a page selection area is set in the page jumped to, for displaying the label of at least one history page visited by the user before the page jumped to, in response to that the user triggers the page selection function.

6. The page control method according to claim 1, further comprising:
acquiring record information of the current page in response to opening the current page; and
taking the record information of the current page as record information of one history page to be stored in a built-in database of the application.

7. The page control method according to claim 1, further comprising:
for each of the at least one history page, sending a deletion instruction to a built-in database of the application to delete record information corresponding to the label of the history page, in response to an operation of deleting the label of the history page by the user.

8. The page control method according to claim 1, further comprising:
for each of the at least one history page, calling a sharing interface of the application to share a link corresponding to the label of the history page to an application to be shared, in response to that the user triggers a sharing function of the label of the history page.

9. A page control apparatus for history pages of browsed data comprising:
a processor; and
a memory coupled to the processor and storing instructions that when executed by the processor, cause the processor to:
detect an operation of a user on a current page of an application;
display a label of each of at least one history page visited by the user in a browsing session, in response to detecting that the user triggers a page selection function; and
jump to a page corresponding to a label selected by the user from the current page, in response to detecting that the operation of the user is to select the label;
wherein for each of the at least one history page, the label of the history page comprises an "add to shopping cart" function key in a case that the label of the history page is a label of a commodity detail page, and the memory further storing instructions that when executed by the processor, cause the processor to:
calling a preset interface to send a commodity identification corresponding to the label of the history page to a server for recoding a behavior that the user adds the commodity into the shopping cart recording, in response to that the user triggers a function "add to shopping cart".

10. The page control apparatus according to claim 9, wherein displaying a label of each of at least one history page visited by the user, in response to detecting that the user triggers a page selection function comprises:
reading record information of the at least one history page from a built-in database of the application, in response to detecting that the user triggers the page selection function; and
generating the label of each of the at least one history page according to the record information for displaying.

11. The page control apparatus according to claim 9, wherein the record information of the at least one history page comprises identification information of each of the at least one history page, a link to each of the at least one history page, a type of each of the at least one history page and access time to each of the at least one history page, and the generating the label of each of the at least one history page according to the record information for displaying comprises:
for each of the at least one history page, generating the label of the history page according to the identification information of the history page and the type of the history page, wherein the identification information of the history page is displayed in the label of the history page;
in a case where the at least one history page comprises multiple history pages, ranking the labels of the history pages according to the access time to each of the history pages to obtain a ranking result and displaying the ranking result; and
for each of the at least one history page, establishing a deep link between the label of the history page and the history page.

12. The page control apparatus according to claim 9, wherein the label of each of the at least one history page is associated with the link to the history page, and the jumping to a page corresponding to a label selected by the user from the current page, in response to detecting that the operation of the user is to select the label comprises:
jumping to the page corresponding to the label selected by the user from the current page according to the link associated with the label, in response to detecting that the operation of the user is to select the label.

13. The page control apparatus according to claim 9, wherein a page selection area is set in the page jumped to, for displaying the label of at least one history page visited by the user before the page jumped to, in response to that the user triggers the page selection function.

14. The page control apparatus according to claim 9, wherein the memory further storing instructions that when executed by the processor, cause the processor to:
acquire record information of the current page in response to opening the current page; and
take the record information of the current page as record information of one history page to be stored in a built-in database of the application.

15. The page control apparatus according to claim 9, wherein the memory further storing instructions that when executed by the processor, cause the processor to:
for each of the at least one history page, sending a deletion instruction to a built-in database of the application to delete record information corresponding to the label of the history page, in response to an operation of deleting the label of the history page by the user.

16. The page control apparatus according to claim 9, wherein the memory further storing instructions that when executed by the processor, cause the processor to:
for each of the at least one history page, calling a sharing interface of the application to share a link corresponding to the label of the history page to an application to be shared, in response to that the user triggers a sharing function of the label of the history page.

17. A non-transitory computer-readable storage medium storing computer programs, when executed by a processor, cause the processor to:
detect an operation of a user on a current page of an application;
display a label of each of at least one history page visited by the user in a browsing session, in response to detecting that the user triggers a page selection function; and
jump to a page corresponding to a label selected by the user from the current page, in response to detecting that the operation of the user is to select the label;
wherein for each of the at least one history page, the label of the history page comprises an "add to shopping cart"

function key in a case that the label of the history page is a label of a commodity detail page, and the memory further storing instructions that when executed by the processor, cause the processor to:

calling a preset interface to send a commodity identification corresponding to the label of the history page to a server for recoding a behavior that the user adds the commodity into the shopping cart recording, in response to that the user triggers a function "add to shopping cart".

18. The non-transitory computer-readable storage medium according to claim 17, wherein displaying a label of each of at least one history page visited by the user, in response to detecting that the user triggers a page selection function comprises:

reading record information of the at least one history page from a built-in database of the application, in response to detecting that the user triggers the page selection function; and generating the label of each of the at least one history page according to the record information for displaying.

* * * * *